June 20, 1972    C. T. HOYT ET AL    3,671,077
FORAGE BLOWER

Filed Sept. 24, 1969    2 Sheets-Sheet 1

June 20, 1972   C. T. HOYT ET AL   3,671,077
FORAGE BLOWER

Filed Sept. 24, 1969   2 Sheets-Sheet 2

United States Patent Office 3,671,077
Patented June 20, 1972

3,671,077
FORAGE BLOWER
Charles T. Hoyt, John W. Haun, and Dwight L. Hensel, Brillion, Wis., Clarence M. Hansen, East Lansing, Mich., Walter G. Lovely, Ames, Iowa, and Hjalmar D. Bruhn, Madison, Wis., assignors to Brillion Iron Works, Inc., Division of Beatrice Foods Co., Brillion, Wis.
Filed Sept. 24, 1969, Ser. No. 860,496
Int. Cl. B65g 53/08, 53/46
U.S. Cl. 302—8                 4 Claims

ABSTRACT OF THE DISCLOSURE

A fan is supported for rotation about a horizontal axis within a fan housing having an outlet at the top thereof and an inlet at the lower side portion thereof. A feeder means includes a rotor supported for rotation about a vertical axis and including a plurality of radially extending blades. This rotor is surrounded by a hopper open at the top thereof, the hopper including a sloping front wall and a substantially vertically extending rear wall. An outlet portion of the hopper is adapted to direct material from the feeder means into the fan housing.

BACKGROUND OF THE INVENTION

The present invention relates to a forage blower which is especially adapted to blow forage material from ground level upwardly to the top of a silo or the like.

In the prior art, forage blowers have commonly employed mechanical feeder means such as an auger. When feeding in material such as haylage, an auger feeding means will not feed the material evenly and will often cause the material to bridge over. The uneven flow produced by auger feeding means usually results in plugging of the blower pipes.

When utilizing auger feed means or some other type of mechanical conveyor, the material is moved solely by mechanical means which thereby limits the amount of material which can be handled and further is prone to cause the material to be fed in small, rather tightly packed bunches of material.

SUMMARY OF THE INVENTION

In the present invention, a fan is supported within a fan housing for rotation about a substantially horizontal axis. The outlet from the fan housing is disposed at the upper portion thereof, and the inlet to the fan housing is positioned at a lower side portion thereof.

The feeder means of the present invention is disposed at one side of the fan housing adjacent the inlet thereof and includes a rotor which is mounted for rotation about a substantially vertically extending axis. The rotor includes a plurality of radially extending blades which have a small vertical dimension whereby a thin cushion of air is produced. This thin cushion of air is directed through an outlet portion of a surrounding hopper and into the inlet of the fan housing.

The thin cushion of moving air which is produced by the feeder means of the present invention carries most of the material into the fan housing without touching the bottom of the feeder means.

In the blower of the present invenion, material such as haylage will be fed evenly and will not result in plugging of the blower pipes. The material is broken up by the feeder means and there is an almost steady stream of loose material. No force other than the air currents and gravity are required to move the material onto the rotor of the feeder means. The moving cushion of air and centrifugal force produced by the rotor serve to move the material into the fan housing.

The blades of the rotor means have a vertical dimension which is as small as possible while still giving the blades sufficient strength to resist bending when small amounts of material build up with respect to the surrounding hopper.

The hopper of the present invention includes a front wall which slopes downwardly and inwardly so that material can be fed into it any place along the sloping portion thereof. The sloped end of the hopper provides the path of least resistance for air to enter so that it has a tendency to pull light material down and into the feed means to help prevent blow-back.

The sloping front wall of the hopper should be at an angle of at least 45° and preferably 50° with respect to horizontal so that material will slide downwardly off of it and will not tend to build up or bridge on the edge of the hopper.

The rear wall of the hopper extends substantially vertically with sufficient height to prevent material from being thrown out at the cut-off point where the material enters the fan housing.

DESCRIPTION OF THE PREFERRED EMBODIMENT

Figure 1:
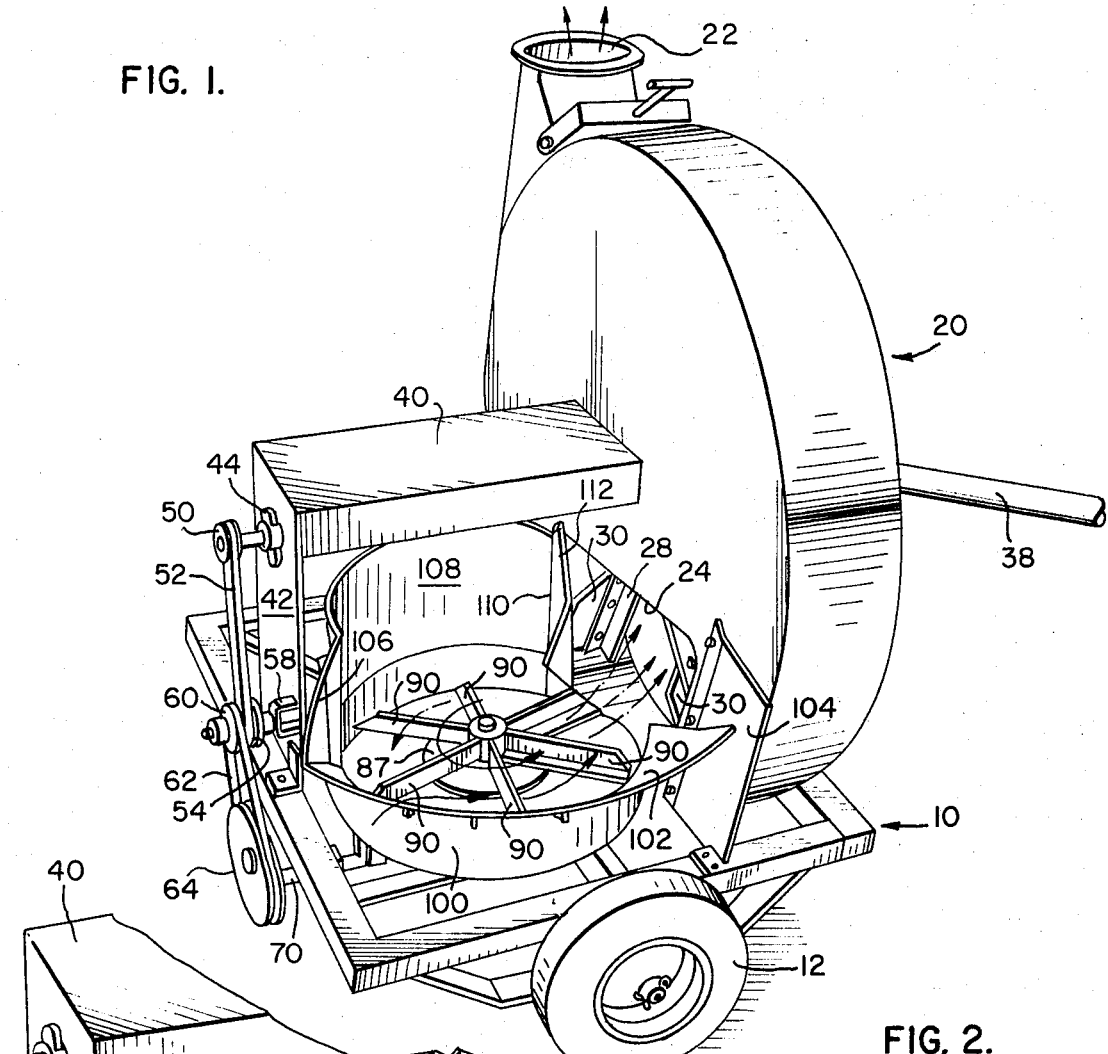
FIG. 1 is a top perspective view of a forage blower according to the present invention.
Figure 2:
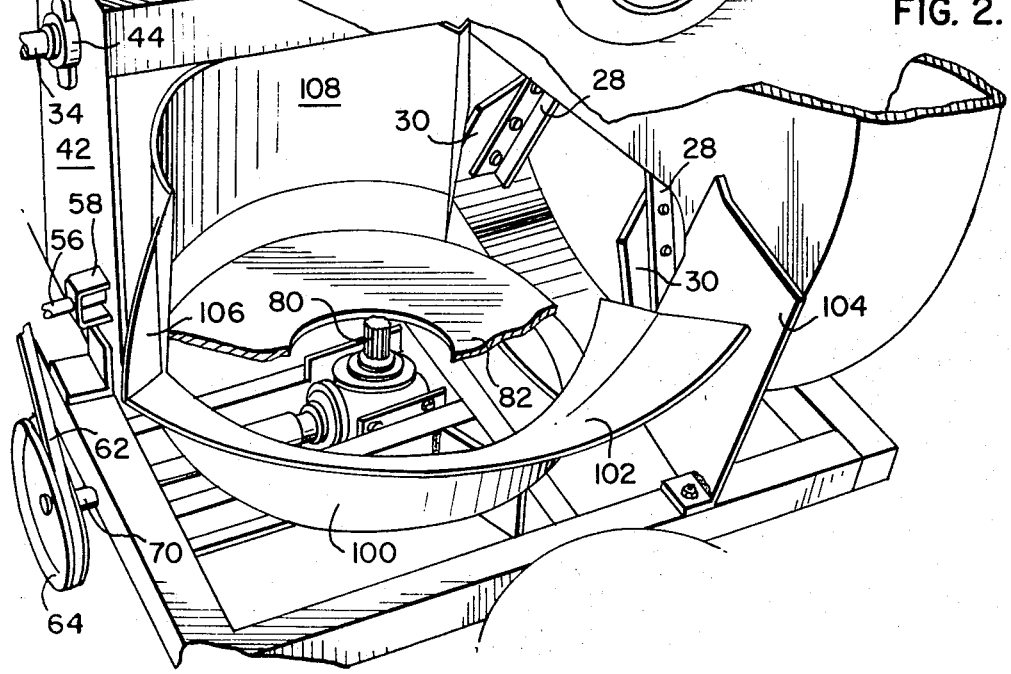
FIG. 2 is an enlarged view of a portion of the structure shown in FIG. 1, broken away to illustrate certain details of construction.
Figure 3:
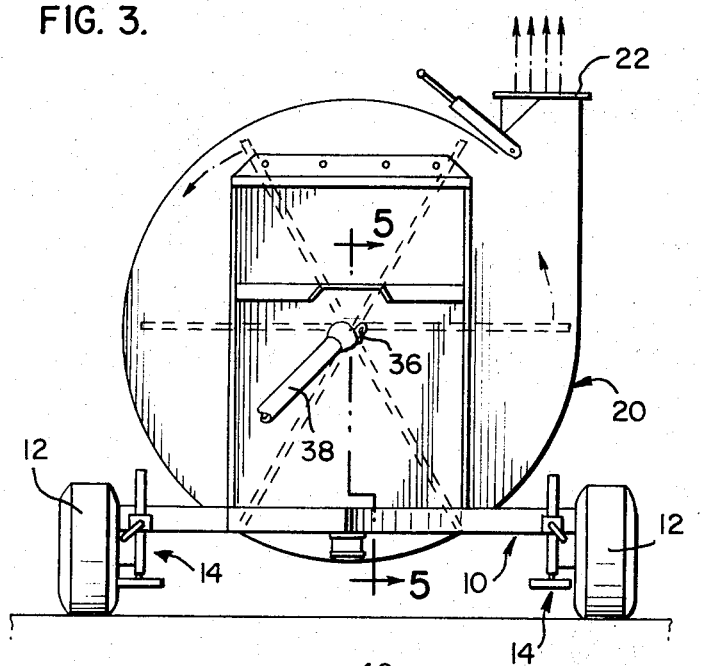
FIG. 3 is an end view of the blower according to the present invention.
Figure 4:
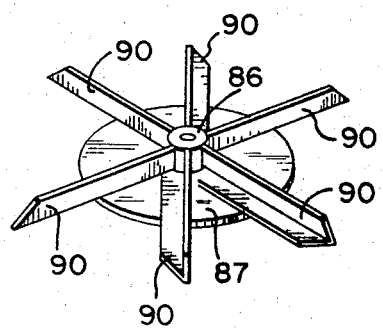
FIG. 4 is a top perspective view of the rotor of the present invention.
Figure 5:
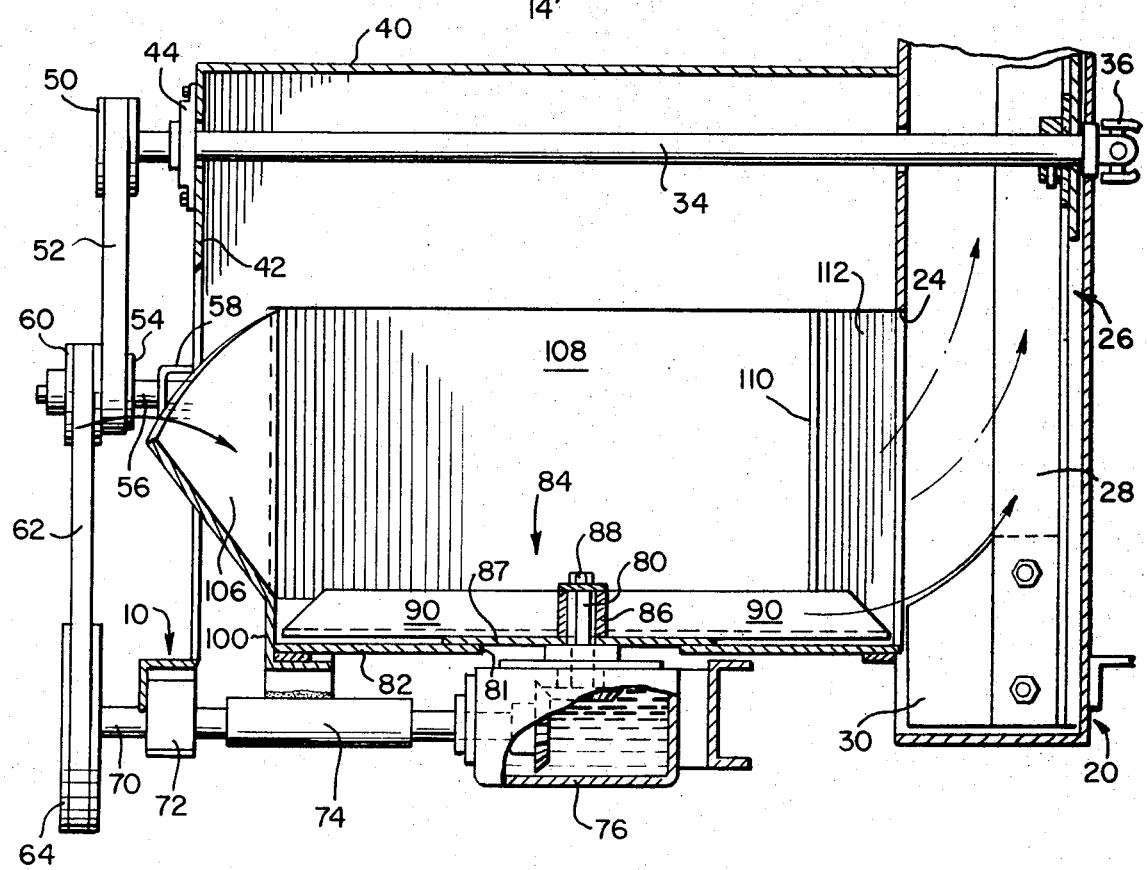
FIG. 5 is a sectional view on an enlarged scale taken substantially along line 5—5 of FIG. 3 looking in the direction of the arrows.

Referring now to the drawings wherein like reference characters designate corresponding parts throughout the several views, the forage blower includes a supporting framework 10 carried by rubber-tired wheels 12 so that the blower may be readily towed from place to place. Conventional manually adjustable jack assemblies 14 are provided on the framework for providing a solid support for the blower when it is disposed in operative position.

A fan housing indicated generally by reference numeral 20 is suitably secured to the supporting framework and includes a vertically upwardly directed outlet 22 at the upper portion thereof. A laterally extending horizontal outlet 24 is provided in a lower side portion of the fan housing. The fan housing includes the usual fan supported therewithin for rotation about a substantially horizontal axis, the fan being indicated generally by reference numeral 26 and including a plurality of radially extending arms 28 having blades 30 carried at the outer ends thereof.

The fan is connected to a horizontally extending drive shaft 34 which is connected through a universal joint 36 with a shaft 38 drivingly connected with the power take-off from an associated tractor.

A horizontally extending member 40 has one end secured thereof to the side of the fan housing 20, the opposite end of member 40 being supported by vertically extending member 42 extending upwardly from and supported by an adjacent portion of the supportnig framework 10. Vertically extending member 42 has a bearing 44 supported thereby, and shaft 34 is rotatably journaled in bearing 44, this shaft extending through suitable holes in the intermediate vertically extending portions of the fan housing and member 42.

A drive pulley 50 is fixed to the end of shaft 34 and is drivingly interconnected by means of a belt 52 with a pulley 54 supported on a shaft 56 which in turn is carried by support means 58 secured to vertically extending member 42. A drive pulley 60 is drivingly interconnected with drive pulley 54 and is further drivingly interconnected by means of belt 62 with a pulley 64 secured to the outer end of a shaft 70.

Shaft 70 is rotatably journaled by support portions 72 and 74 suitably carried by the support framework 10 previously described. The inner end of shaft 70 extends within an angle gear box 76 and is in turn drivingly interconnected through the gear box with a splined output shaft 80 extending through a central hole 81 in the bottom wall 82 of a hopper hereinafter described.

Output shaft 80 is in turn drivingly interconnected with a rotor indicated generally by reference numeral 84, this rotor including a hollow hub portion 86 which is suitably splined to receive the splined shaft 80, hub portion 86 including a flat disc-like portion 87 of circular configuration overlying and being of greater diameter than hole 81. The rotor is secured to output shaft 80 by means of a suitable fastening member 88 such as a machine screw or the like.

The rotor includes a plurality of blades 90, these blades each comprising an angle member. The inner ends of said angle members are secured to the hub 86 and the bottoms of the angle members rest upon and may be secured to the upper surface of disc-like portion 87. The outer portions of blades 90 extend outwardly beyond the outer periphery of disc-like portion 87. These blades have a minimum vertical dimension, and yet at the same time have sufficient strength to resist bending. The blades of the rotor produce a thin cushion of air traveling in the direction of the arrows shown in FIG. 1 wherein the rotor rotates in a counterclockwise direction.

It will be noted that the fan is supported for rotation about a substantially horizontally extending axis while the rotor is mounted for rotation about a substantially vertically extending axis, and the rotor is driven by the same drive means which causes rotation of the fan. The moving layer of air produced by the blades of the rotor as well as the centrifugal force of the rotor will move the material through the inlet and into the fan housing.

A hopper is disposed in surrounding relationship to the rotor and includes a lower portion 100 spaced outwardly from the tips of the blades 90 of the rotor and connected with and extending upwardly from the outer edge of the aforementioned bottom wall 82. The hopper includes an arcuate sloping front wall 102 which slopes downwardly and inwardly toward the rotor at an angle of at least approximately 45° and preferably 50° with respect to horizontal so that material will readily slide off of the sloping portion of the hopper and will not build up a bridge on the edge thereof. Material is adapted to be dropped into the top of the hopper any place along the sloping portion of the hopper.

One end of the sloping front wall of the hopper terminates at a plate 104 secured to the side of the fan housing. The opposite end of the sloping front wall of the hopper joins with a generally vertically directed portion 106 which in turn joins with a substantially vertically disposed rear wall 108 which has a greater vertical dimension than the front wall 102. This rear wall defines a vertically extending cut-off point 110 which in turn joins with a portion 112 extending inwardly toward one end of the inlet opening 24 in the side of the fan housing.

It is necessary to provide the vertical rear wall of the hopper with a sufficient vertical dimension to prevent material from being thrown out at the cut-off point 110 where the material enters the fan housing.

The portion of the feed hopepr between the end of the sloping front wall adjacent plate 104 and the cut-off point 110 defines an outlet portion directed in the direction of rotation of the fan, this outlet portion extending at an oblique angle to the plane of the fan so that material is properly directed from the hopper into the fan housing.

As this invention may be embodied in several forms without departing from the spirit or essential characteristcis thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What we claim is:
1. A forage blower comprising in combination:
   (a) a fan housing including an outlet in the upper portion thereof and an inlet at one side thereof,
   (b) fan means supported for rotation within said fan housing about an axis,
   (c) drive means for rotating said fan,
   (d) feeder means disposed adjacent said inlet, said feeder means including a feed hopper and means for moving feed from said hopper to said inlet of said fan housing,
   (e) said feed hopper including
      (1) a horizontal bottom wall that has a hole inwardly of its peripheral edges,
      (2) sidewalls including:
         (A) a back sidewall portion that comprises a vertical section extending upwardly from said bottom wall
         (B) a front sidewall portion that includes both a lower vertical section extending upwardly from said bottom wall and a sloping section extending above said vertical section,
         (C) the height of said vertical sections of said sidewalls being less than the maximum horizontal dimension of said bottom wall, and the height of said vertical section of said back sidewall portion being substantially the same as the vertical height of said inlet of said fan housing,
   (f) said means for moving feed from said hopper to said inlet of said fan housing comprising
      (1) a rotor extending upwardly through the hole in said horizontal bottom wall, and being supported for rotation about a substantially vertical axis,
      (2) means for rotating said rotor about said vertical axis,
      (3) a plurality of blades extending radially outwardly from the axis of rotation of the rotor at a level which is near the level of the bottom of the inlet of said fan housing.

2. A forage blower in accordance with claim 1 wherein said rotor includes a disc-like portion that is disposed closely parallel to said bottom wall.

3. Apparatus as defined in claim 1 wherein said blades have a relatively small dimension in the direction parallel with the axis of rotation of said rotor so as to produce a relatively thin cushion of air for carrying material into the fan housing.

4. Apparatus as defined in claim 1 wherein said means for rotating the rotor is drivingly interconnected with the drive means for said fan.

References Cited

UNITED STATES PATENTS

| | | | |
|---|---|---|---|
| 2,488,626 | 11/1949 | Hansen | 302—37 |
| 2,721,767 | 10/1955 | Kropp | 302—37 |
| 3,466,095 | 9/1969 | Weihmuller | 302—37 |
| 631,615 | 8/1899 | Brown | 302—37 |
| 733,289 | 7/1903 | Silver | 302—37 X |
| 1,825,838 | 10/1931 | Wessman | 302—37 X |
| 1,496,913 | 6/1924 | Warford | 302—50 |
| 2,717,812 | 9/1955 | Eglitis | 214—17.84 |
| 3,019,005 | 1/1962 | Van Dusen | 214—17.84 |

FOREIGN PATENTS

| | | | |
|---|---|---|---|
| 1,076,934 | 3/1960 | Germany | 302—37 |
| 294,221 | 6/1963 | Netherlands | 302—37 |

EVON C. BLUNK, Primary Examiner

W. S. CARSON, Assistant Examiner

U.S. Cl. X.R.

302—37

Disclaimer 3,671,077.—*Charles T. Hoyt, John W. Haun,* and *Dwight L. Hensel,* Brillion, Wis., *Clarence M. Hansen,* East Lansing, Mich., *Walter G. Lovely,* Ames, Iowa, and *Hjalmar D. Bruhn,* Madison, Wis. FORAGE BLOWER. Patent dated June 20, 1972. Disclaimer filed May 6, 1974, by the assignee, *Sperry Rand Corporation.*

Hereby enters this disclaimer to claims 1–4 of said patent.

[*Official Gazette June 25, 1974.*]

Disclaimer 3,671,077.—*Charles T. Hoyt, John W. Haun* and *Dwight L. Hensel*, Brillion, Wis., *Clarence M. Hansen*, East Lansing, Mich., *Walter G. Lovely*, Ames, Iowa, and *Hjalmar D. Bruhn*, Madison, Wis. FORAGE BLOWER. Patent dated June 20, 1972. Disclaimer filed May 6, 1974, by the assignee, *Sperry Rand Corporation*.

Hereby enters this disclaimer to claims 1–4 of said patent.

[*Official Gazette November 26, 1974.*]